United States Patent
Christiansen (12)

(10) Patent No.: US 6,405,692 B1
(45) Date of Patent: Jun. 18, 2002

(54) OUTBOARD MOTOR WITH A SCREW COMPRESSOR SUPERCHARGER

(75) Inventor: Erik J. Christiansen, West Bend, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/817,395

(22) Filed: Mar. 26, 2001

(51) Int. Cl.$^7$ ................................................ F02B 75/02
(52) U.S. Cl. ............... 123/65 BA; 123/564; 123/559.1; 123/311; 60/599; 418/206.1; 417/406
(58) Field of Search ............................ 123/564, 65 BA, 123/559.1, 311, 198 R; 418/206.1; 417/406; 60/599

(56) References Cited

U.S. PATENT DOCUMENTS

| | | | |
|---|---|---|---|
| 3,808,807 A | | 5/1974 | Lanpheer .................... 60/313 |
| 4,587,935 A | * | 5/1986 | Yamazaki ............... 123/198 R |
| 4,741,162 A | * | 5/1988 | Torigai ........................ 60/599 |
| 4,802,457 A | | 2/1989 | Oscarsson .................. 123/564 |
| 4,826,412 A | * | 5/1989 | Kubo et al. ................ 123/564 |
| 4,827,722 A | | 5/1989 | Torigai ........................ 60/599 |
| 4,951,638 A | * | 8/1990 | Tsuboi et al. ............ 123/559.1 |
| 5,072,707 A | * | 12/1991 | Takai et al. ................ 123/311 |
| 5,192,199 A | * | 3/1993 | Olofsson .................... 417/406 |
| 5,239,950 A | | 8/1993 | Takahashi .................... 123/65 |
| 5,241,817 A | | 9/1993 | George, Jr. ................... 60/39 |
| 5,261,356 A | | 11/1993 | Takahashi ..................... 123/41 |
| 5,293,846 A | | 3/1994 | Takahashi ..................... 123/65 |
| 5,332,376 A | | 7/1994 | Lindbrandt ................. 418/179 |
| 5,730,586 A | * | 3/1998 | Sayama ...................... 123/564 |
| 5,791,315 A | * | 8/1998 | Riach et al. ................ 123/564 |
| 5,908,013 A | * | 6/1999 | Dyess .................... 123/65 BA |
| 5,911,211 A | * | 6/1999 | Uchida .................... 123/559.1 |
| 6,055,967 A | * | 5/2000 | Miyagi et al. .............. 123/564 |
| 6,253,747 B1 | * | 7/2001 | Sell et al. ................ 123/559.1 |

FOREIGN PATENT DOCUMENTS

DE         25 43 073 A   *   4/1976

* cited by examiner

*Primary Examiner*—Thomas Denion
*Assistant Examiner*—Thai-Ba Trieu
(74) *Attorney, Agent, or Firm*—William D. Lanyi

(57) ABSTRACT

An outboard motor is provided with an engine having a screw compressor which provides a pressurized charge for the combustion chambers of the engine. The screw compression has first and second screw rotors arranged to rotate about vertical axes which are parallel to the axes of a crankshaft of the engine. A bypass valve regulates the flow of air through a bypass conduit extending from an outlet passage of the screw compressor to the inlet passage of the screw compressor. A charge air cooler is used in a preferred embodiment and the bypass conduit then extends between the cold side plenum of the charge air cooler and the inlet of the compressor. The bypass valve is controlled by an engine control module in order to improve power output from the engine at low engine speeds while avoiding any violation of existing limits on the power of the engine at higher engine speeds.

13 Claims, 4 Drawing Sheets

OUTBOARD MOTOR WITH A SCREW COMPRESSOR SUPERCHARGER

BACKGROUND OF THE INVENTION

1. Field of the Invention

The present invention is generally related to an outboard motor with a supercharger and, more particularly, to an outboard motor having a screw compressor which provides pressurized charge air for the engine.

2. Description of the Prior Art

Superchargers used in conjunction with internal combustion engines are well known to those skilled in the art. In automobile applications, both Roots compressors and screw compressors have been used to provide pressurized charge air for the engine. U.S. Pat. No. 5,332,376, which issued to Lindbrandt on Jul. 26, 1994, describes a screw compressor for use with an internal combustion engine. The screw compressor, especially adapted for use as a supercharger for an internal combustion engine, comprises a housing having a barrel section preferably made from aluminum and two end sections, in which housing a pair of screw rotors are mounted. The end sections are provided with projections inserted into the end portions of the barrel section by forced fit between surfaces of the projections. The end portions of the barrel section are also secured to the barrel section by screw joints.

U.S. Pat. No. 5,241,817, which issued to George, Jr. on Sep. 7, 1993, describes a screw compressor with regenerative braking. A screw engine for propelling a wheeled vehicle via a continuously variable transmission is characterized by a ceramic screw compressor and a ceramic screw expander mounted on a common shaft of the continuously variable transmission. The compressor compresses air and delivers it to a combustion chamber. The air is mixed with fuel in the chamber and ignited to produce combustion products. The combustion products are expanded by the expander to produce a work output for driving the continuously variable transmission and an exhaust output. A heat exchanger is connected with the expander to recover heat from the exhaust output.

U.S. Pat. No. 4,802,457, which issued to Oscarrson on Feb. 7, 1989, describes an internal combustion engine provided with a supercharger. In a conventional throttle-controlled internal combustion engine equipped with a supercharger, a compressor is provided with screw rotors arranged in a compression chamber. The supercharger is inactive at part engine loads. Since the engine normally operates at part loads for about 95% of its running time, efficiency is correspondingly poor. This drawback is overcome with the arrangement according to the invention in which a screw compression is provided on the inlet side thereof with a capacity regulating device which is opened by a gas pedal, or accelerator, and which when the engine is only partially loaded, is adjusted to a corresponding position in which the compressor operates as an expander of variable throttle effect on the engine inlet side and transmits power to the engine, thereby replacing the conventional gas throttle.

When superchargers are used in conjunction with an internal combustion engine, they are typically used to provide additional power at high loads and engine speeds. In other words, at high engine speeds, the supercharger provides additional pressurized charge air to increase the horsepower output of the engine to a magnitude greater than would than otherwise be achievable without the use of a supercharger. At lower engine speeds, the supercharger is typically either deactivated completely or its overall effect on engine operation is reduced by bypassing a significant percentage of the pressurized air emitted by the compressor.

In certain types of outboard motor applications, such as with four cycle internal combustion engines, the power output of the engine at low engine operating speeds is insufficient for the intended operation of the outboard motor. For example, when an outboard motor is used to propel a marine vessel, certain power requirements are needed to increase the speed of the marine vessel from a stationary condition to a sufficient velocity that enables the vessel to rise up to a planing condition. This requires the generation of significant power at relatively low engine speeds. If the engine is sized to provide this level of output power at low engine operating speeds, it is typical and expected that the output power of the engine will exceed allowable horsepower output limits at higher engine operating speeds. It would therefore by significantly beneficial if an engine can be sized to achieve allowable power output at maximum operating speeds, but also to achieve higher than expected power output at lower engine speeds.

SUMMARY OF THE INVENTION

An outboard motor made in accordance with the preferred embodiment of the present invention comprises an internal combustion engine having a plurality of cylinders, each of said plurality of cylinders having one of a plurality of pistons slidably disposed therein for reciprocal movement. It also comprises a crankshaft that is driven by the plurality of pistons of the engine and supported within the engine for rotation about a vertical axis. A propulsor is connected in torque transmitting relation with the crankshaft. The propulsor can be a marine propeller or an impeller. An air conduit is connected in fluid communication with the plurality of cylinders and a screw compressor, having an inlet passage and an outlet passage, is connected with its outlet passage in fluid communication with the air conduit. In this way, the screw compressor provides compressed air from its outlet passage into the air conduit, or intake manifold, for transmission to each of the plurality of cylinders. More particularly, the pressurized air from the screw compressor outlet passage is provided to the combustion chambers of the plurality of cylinders.

The screw compressor comprises a first screw rotor rotatable about a first rotor axis and a second screw rotor rotatable about a second rotor axis. The first and second rotor axes are parallel to the vertical axis about which the crankshaft of the engine rotates. The outboard motor, in certain embodiments of the present invention, can further comprise a charge air cooler disposed in fluid communication with the air conduit. The outboard motor can also comprise a bypass conduit disposed in fluid communication between the inlet passage and the outlet passage of the screw compressor. A bypass valve is disposed within the bypass conduit in order to control the flow of air from the outlet passage to the inlet passage. This flow of air can be intentionally directed around the compressor as a bypass flow which allows an engine control module to regulate the amount of charge air provided by the screw compressor to the combustion chambers of the engine. Throughout the description of the present invention, the screw compressor will be described as having parallel rotor axes. This is generally true during operation of the compressor but, as is known by those skilled in the art of screw compressor design, the two rotational axes of the rotors are actually slightly closer together at the exhaust end than at the inlet end. This is done to allow for the normal expansion of the exhaust end components during operation. This slight difference is included in the definition of term "parallel" in this context.

A particularly preferred embodiment of the present invention further comprises a tachometer associated with the internal combustion engine which provides an engine speed signal representative of the speed of the engine. The engine control module is connected in signal communication with the tachometer and with the bypass valve. The engine control module is configured to open the bypass valve to a magnitude which is a function of the engine speed signal. More specifically, the engine control module causes the bypass valve to be closed when the engine speed signal represents an engine speed below a preselected threshold. In a preferred embodiment of the present invention, the engine control module is provided with a data matrix which contains specific states of the bypass valve for specific combinations of values that are a function of throttle position, engine speed, and manifold absolute pressure values. These relationships are determined for each particular application of the present invention. This operation reduces the bypass flow and increases the pressurized air flow to the combustion chambers. The engine control module also causes the bypass valve to be at least partially opened when the engine speed signal represents an engine speed above the preselected threshold. In this way, the engine control module reduces the amount of air that would otherwise have been provided by the screw compressor to the combustion chambers of the engine. The bypass valve is connected between the compressor's inlet and outlet to allow recirculation of compressed air at a rate determined by the status of the bypass valve.

In certain embodiments of the present invention, the screw compressor is attached to the internal combustion engine at a front side of the engine and the first and second screw rotors have five and three flutes, respectively. The screw compressor is connected in torque transmitting relation with the crankshaft of the engine by an arrangement of two pulleys and an interconnecting belt.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
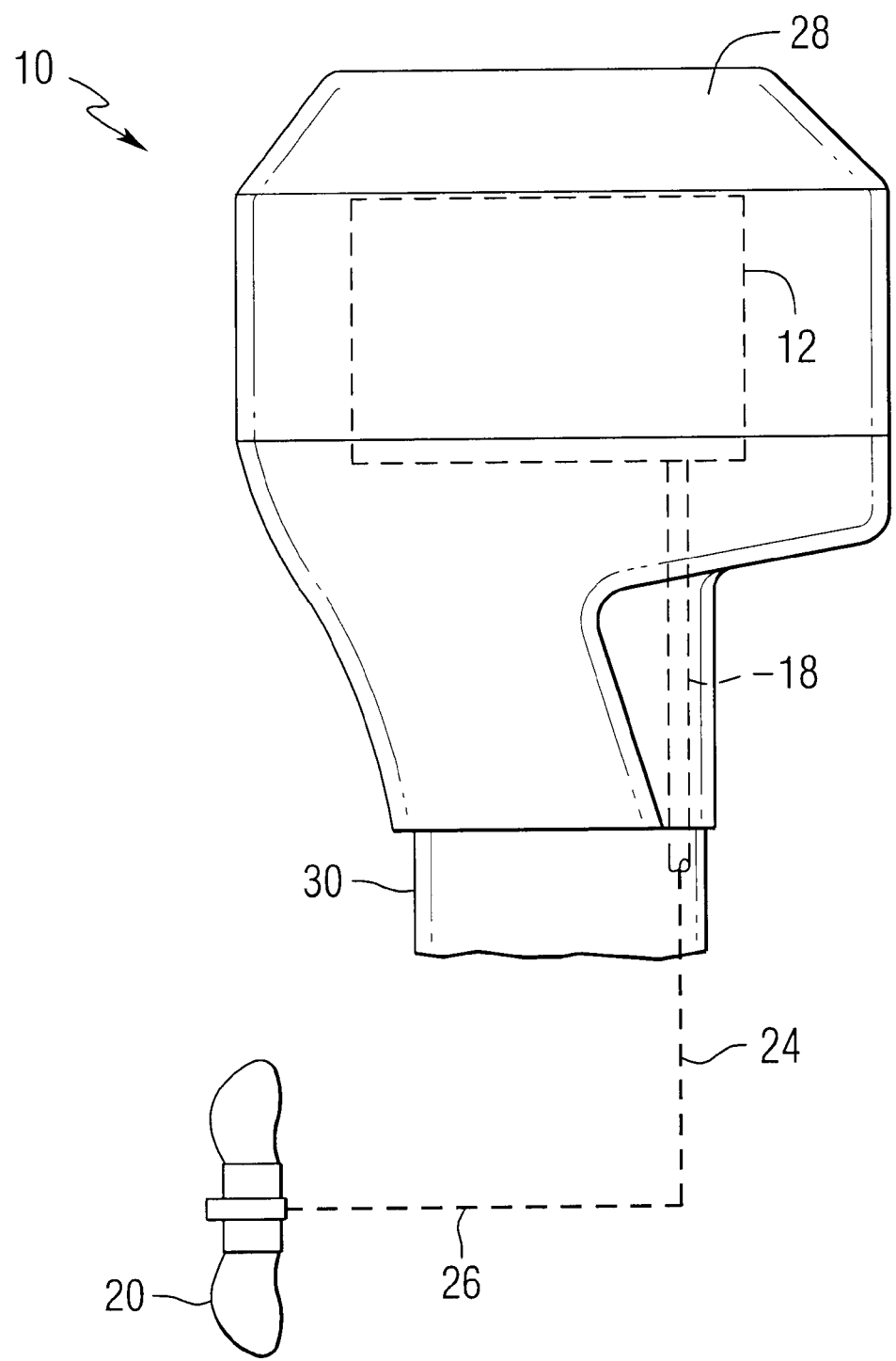
FIG. 1 is an exemplary illustration of an outboard motor.

Throughout the description of the preferred embodiment of the present invention, like components will be identified by like reference numerals.

Outboard marine engines require an engine which provides a well balanced delivery of both low speed and high speed power. This balance, along with a light weight package, is highly significant in achieving the expectations of the owners and operators of outboard motors. Tradition two cycle outboard marine engines have met this requirement effectively by inherently having excellent low speed power production that can be used to accelerate a marine vessel from a standing condition to a planing condition in a relatively short period of time. Two cycle outboard marine engines also have adequate power production at higher engine speeds.

Four cycle engines are becoming popular for use in outboard motors because of the need to reduce outboard emissions. Traditionally, naturally aspirated four cycle engines are able to supply sufficient power at high engine speeds, but are typically less able to provide required magnitudes of power output at low speeds. In order to achieve the required output power at low speeds, larger four cycle engines have been needed. This is due to the fact that four cycle engines have a lower volumetric efficiency at low engine speeds when compared to two cycle engines. As a result, four cycle engines typically have to have increased swept volume of its cylinders in order to achieve performance goals.

In order to arrive at an acceptable four cycle engine configuration which provides adequate power at low engine speeds without exceeding allowable engine output power at high engine speeds, a supercharger is provided by the present invention. By appropriately controlling the bypass flow of air around the screw compressor supercharger, from its outlet passage to its inlet passage, the present invention maximizes engine response and improves output power from the engine in the low engine operating speeds where four cycle engines are typically deficient. By partially deactivating the provision of charge air by the screw compressor to the combustion chambers of the engine at high engine operating speeds, the present invention avoids any violation of output power limitations placed on the engine by various manufacturing standards.

FIG. 1 is a simplified representation of an outboard motor 10 which comprises an engine 12 having a crankshaft that is connected in torque transmitting relation with an output shaft 18. The output shaft 18 is connected in torque transmitting relation with a propulsor 20, such as a marine propeller, as represented by dashed lines 24 and 26. The engine 12 is typically disposed under a cowl 28 and the driveshaft 18 is typically housed in a driveshaft housing 30.

Figure 2:
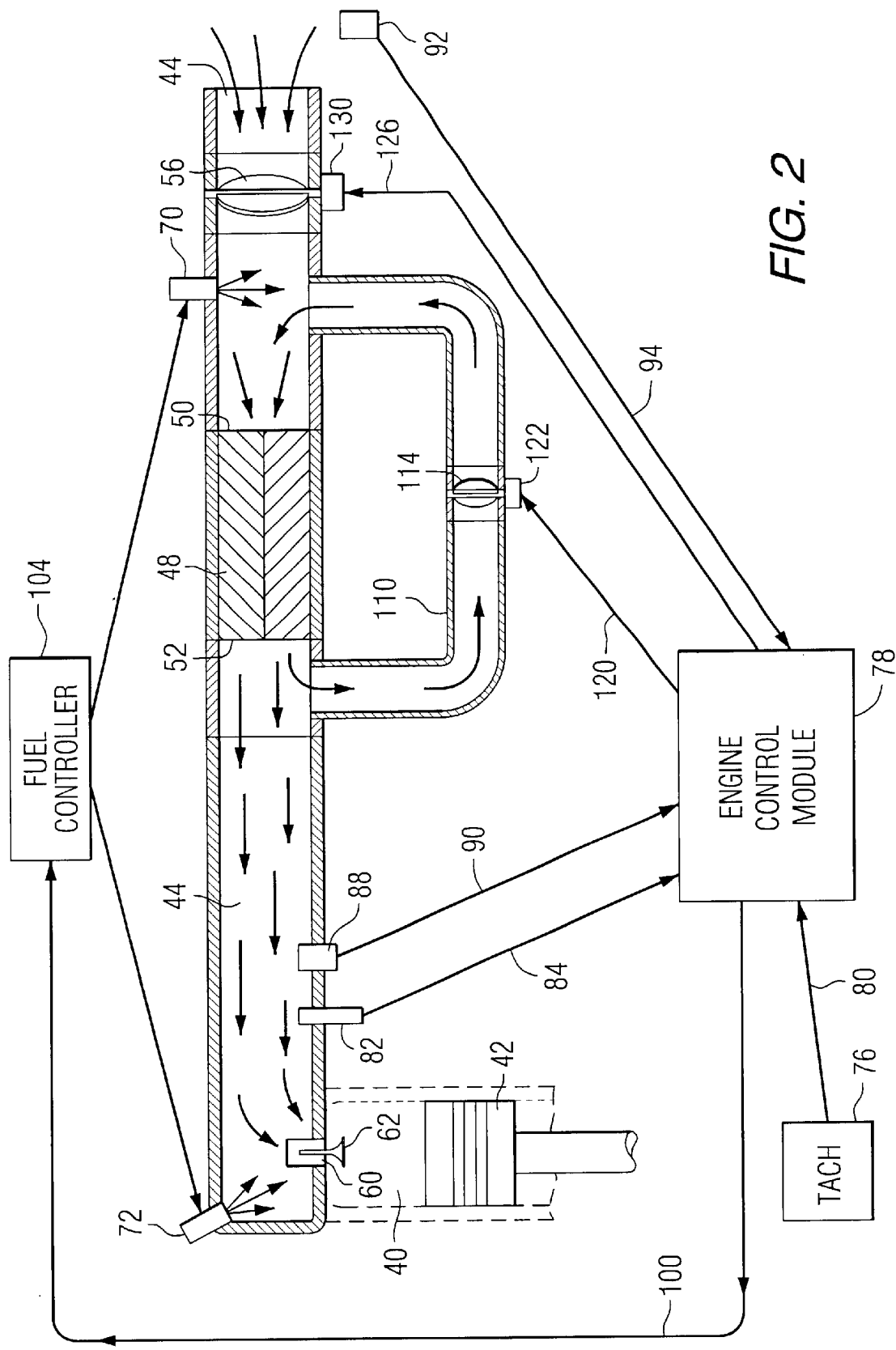
FIG. 2 is a schematic representation of the present invention associated with various other components of an internal combustion engine.

FIG. 2 is a schematic representation of the present invention associated with certain other components of an engine air intake system. It should be understood that FIG. 2 is not intended to show the relative physical position of the various elements or to illustrate their vertical or horizontal position in relation to the engine. Those characteristics will be described in greater detail below.

In FIG. 2, an engine is provided with a plurality of cylinders 40 into each of which one of a plurality of pistons 42 is disposed for reciprocal movement. Although only a single cylinder 40 and piston 42 are shown in FIG. 2, it should be understood that the air provided by the present invention is provided to all of the cylinders. An air conduit 44 is provided to allow ambient air to flow into an inlet of the air conduit 44 and be pressurized by a screw compressor 48 that has an inlet passage 50 and an outlet passage 52. The pressurized flows out of the screw compressor 48 and the pressurized air provided from its outlet passage 52 is directed into an inlet 60 of each of the plurality of cylinders 40. A valve 62 is operated by a camshaft to control the individual flows of air into each of the cylinders 40 at an appropriate time.

Reference numerals 70 and 72 show two fuel injectors that can be provided to inject fuel into the air stream passing through the air conduit 44. A tachometer 76 can provide an engine control module 78 with an engine speed signal 80. In addition, in certain embodiments of the present invention, a temperature sensor 82 can provide a signal on line 84 to the engine control module 78 representing the temperature of air flowing through the air conduit 44. Similarly, a pressure sensor 88 can provide a signal on line 90 to the engine control module 78 representing the manifold air pressure (MAP) within the air conduit 44. Another pressure sensor 92 can provide a signal on line 94 representing ambient air pressure. The operation of these sensors, 82, 88, and 92, and the two fuel injectors, 70 and 72, are described in significant detail in U.S. patent application Ser. No. 09/824,473 which was filed by Suhre et al on Mar. 26, 2001.

The engine control module 78 provides signals, on line 100, to a fuel controller 104 which controls the specific operation of the two fuel injectors, 70 and 72. A bypass conduit 110 is provided in fluid communication between the outlet passage 52 and the inlet passage 50 of the screw compressor 48. The bypass conduit 110 allows air to flow from the outlet passage 52 back to the inlet passage 50. A bypass valve 114 is disposed within the bypass conduit 110 to allow the engine control module (ECM) 78 to control the status of the bypass air flow by opening or closing the bypass valve 114. In order to perform this function, the engine control module 78 provides a signal on line 120 to a throttle control mechanism 122. The engine control module 78 also provides a signal, on line 126, to a control mechanism 130 which allows the engine control module 78 to control the status of the main throttle 56. It should be understood that when the engine control module 78 closes the bypass valve 114, this action increases the amount of air flowing from the outlet passage 52 of the screw compressor 48 to the combustion chamber of the cylinders 40. Conversely, if the engine control module 78 fully opens the bypass valve 114, more air will flow through the bypass conduit 110 and less air will flow from the outlet passage 52 of the screw compressor 48 to the combustion chambers of the engine.

Figure 3:
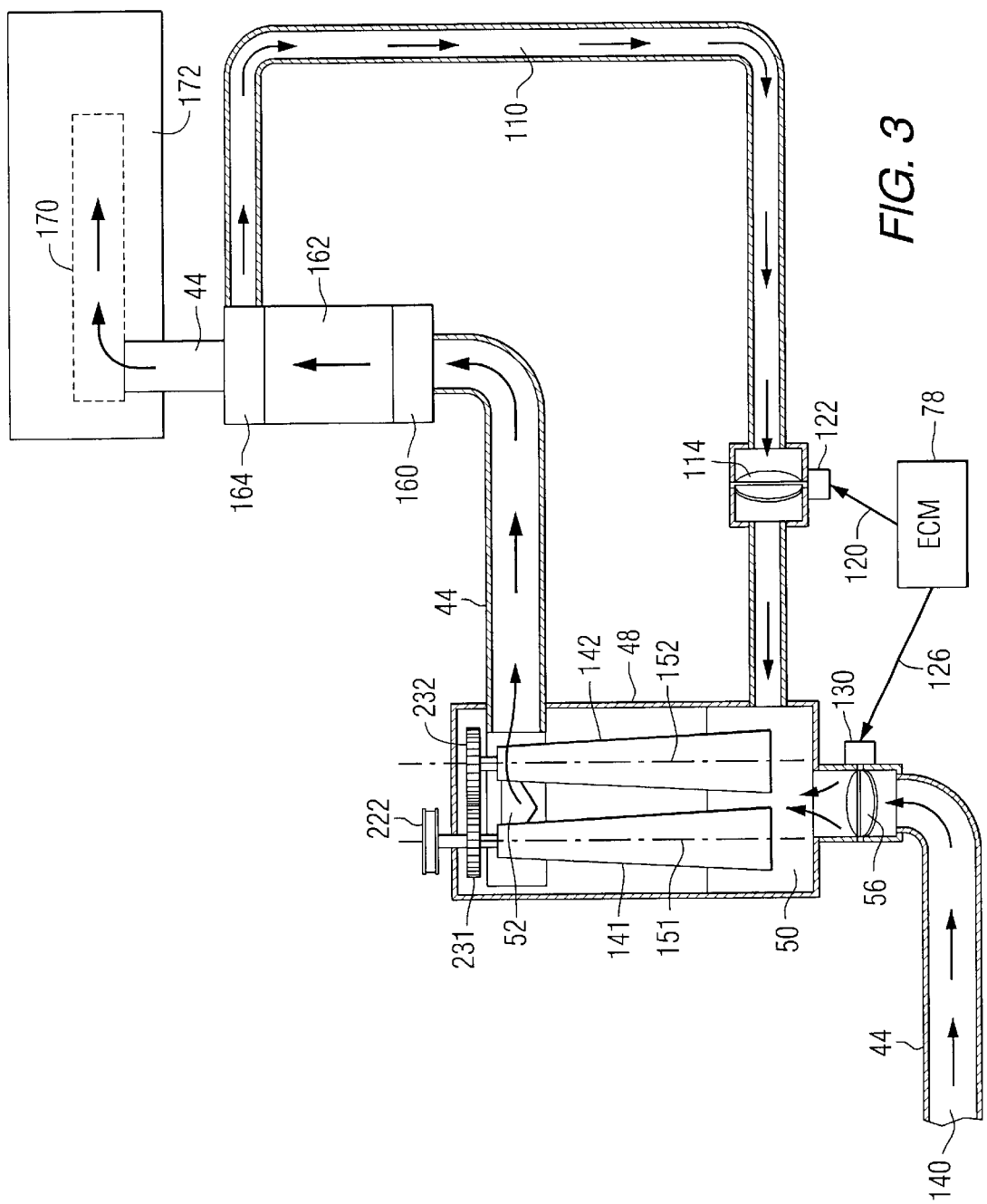
FIG. 3 is an alternative representation of the components illustrated in FIG. 2.

FIG. 3 illustrates a schematic representation of the present invention which is generally similar to that described above in conjunction with FIG. 2, but which provides slightly more detail in combination with a slightly modified application of the present invention. Air flows into an inlet 140 of the air conduit 44 and through a throttle plate 56 to the inlet passage 50 of the screw compressor 48. A first screw rotor 141 and a second screw rotor 142 are provided in the screw compressor 48 for rotation about first and second rotor axes, 151 and 152, respectively. The air is compressed by the interaction of the first and second screw rotors, 141 and 142, and passes out of the outlet passage 52. The pressurized air flow continues to an inlet plenum 160 of a charge air cooler 162. After passing through the heat exchange elements of the charge air cooler 162, the pressurized air flows through the outlet plenum 164 of the charge air cooler 162 and continues into an air intake manifold 170 of the engine 172. Although not shown specifically in FIG. 3, it should be understood that the air flowing into the air intake manifold 170 is directed to a selected plurality of cylinders. The air intake manifold 170 may provide air to all of the cylinders of the engine 172 or, alternatively, this function may be divided between two or more manifolds.

With continued reference to FIG. 3, some of the air flowing to the outlet plenum 160, or the colder side, of the charge air cooler 162 can flow back to the inlet passage 50 of the screw compressor 48. The magnitude of this bypass flow is lo governed by the position of the bypass valve 114. As described above in conjunction with FIG. 2, the position of the bypass valve 114 is governed by the engine control module (ECM) 78. In a particularly preferred embodiment of the present invention, the bypass valve 114 is essentially fully closed at engine operating speeds less than or equal to a preselected magnitude. For example, if the preselected magnitude is 4000 RPM, the engine control module 78 would cause the bypass valve 114 to remain fully closed at engine operating speeds less than or equal to that threshold. This causes all of the air pressurized by the screw compressor 48 to flow to the intake manifold 170 and to the cylinders of the engine 172. This provides the maximum power possible within the constraints of the other control parameters of the engine, such as the fuel per cycle (FPC), the position of throttle 56, and other control parameters that regulate the speed of the engine 172. At engine speeds above the preselected threshold, such as 4000 RPM, the engine control module 78 begins to open the bypass valve 114 to allow some of the pressurized air to flow from the outlet passage 52 of the screw compressor 48 back to the inlet passage 50 of the screw compressor 48. This reduces the power output of the engine 172 in comparison to the potential power output that would have been provided if all of the pressurized air from the outlet passage 52 were provided to the combustion chambers of the cylinders of the engine 172. In this way, the engine control module 78 can moderate the output power of the engine 172 at engine speeds above a preselected threshold.

Figure 4:
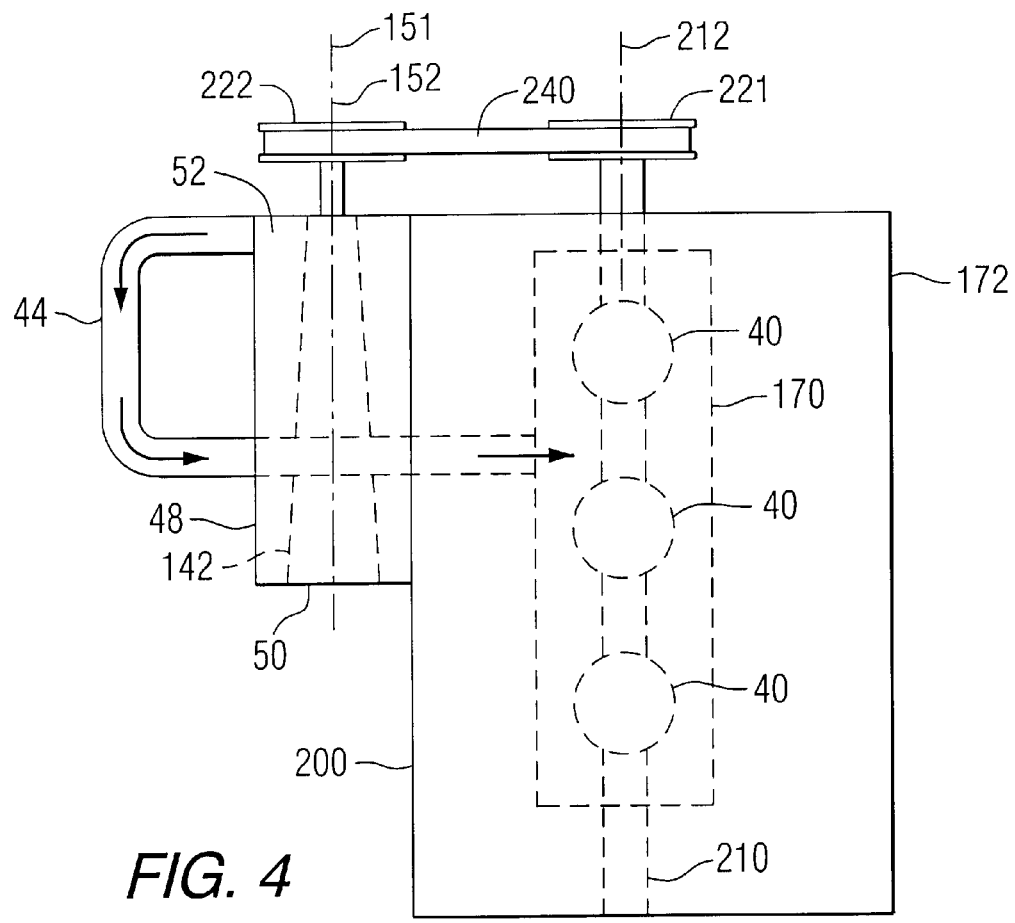
FIG. 4 shows a screw compressor arranged in conjunction with an engine.

FIG. 4 shows the screw compressor 48 attached to a front side 200 of the engine 172. Because of the position of the screw compressor 48 in FIG. 4, the first and second screw rotors, 141 and 142, are aligned with each other. Therefore, only the second screw rotor 142 is identified by reference numeral in FIG. 4. The two rotor axes, 151 and 152, are aligned with each other in FIG. 4. This simplified representation in FIG. 4 shows the outlet passage 52 of the screw compressor 48 providing air, in a direction represented by the arrows in FIG. 4, through the air conduit 44 and to the air intake manifold 170. The air then flows to each of the cylinders 40. Although three cylinders 40 are shown in FIG. 4, it should be understood that the plurality of cylinders 40 can comprise any applicable number of cylinders. In a manner well known to those skilled in the art, the pistons disposed in the cylinders 40 cause a crankshaft 210 to rotate about a vertical axis 212. It can be seen that the first and second rotor axes, 151 and 152, are both arranged in parallel relation with the vertical axis 212 of the crankshaft 210. When used in conjunction with an outboard motor, the crankshaft axis 212 is vertical and aligned with the driveshaft 18 axis as described above in conjunction with FIG. 1. The first and second rotor axes, 151 and 152, are also arranged in a vertical position with the inlet passage 50 of the screw compressor 48 being located at the bottom portion of the screw compressor and the outlet passage 52 of the screw compressor 48 being located at the upper end of the screw compressor.

A first pulley 221 is attached for rotation with the crankshaft 210. A second pulley 222 is attached to the first rotor axis 141 as illustrated in FIG. 3. With reference to FIGS. 3 and 4, the first screw rotor 141 is also connected to a first gear 231. The second screw rotor 142 is attached to a second gear 232. The first and second gears, 231 and 232, are associated in meshing relation with each other. Therefore, rotation of the second pulley 222 will cause the first gear 231 to rotate and, in turn, the meshing relation between the first and second gears will cause the second gear 232 to rotate. As a result, both the first and second screw rotors, 141 and 142, will be caused to rotate and compress the air as it flows in an upward or across direction through the screw compressor 48. A belt 240 connects the first and second pulleys, 221 and 222, in torque transmitting relation. It should be understood that certain embodiments of the present invention could drive the first and second screw rotors, 141 and 142, by providing a chain link or gear tooth connection between the crankshaft 210 and the first screw rotor 141. As illustrated in FIG. 4, rotation of the crankshaft 210 causes the first pulley 221 to rotate and the association of the belt 240 with the second pulley 222 causes the first and second screw rotors, 141 and 142, to rotate and compress air as it flows upward through the screw compressor 48.

Figure 5:
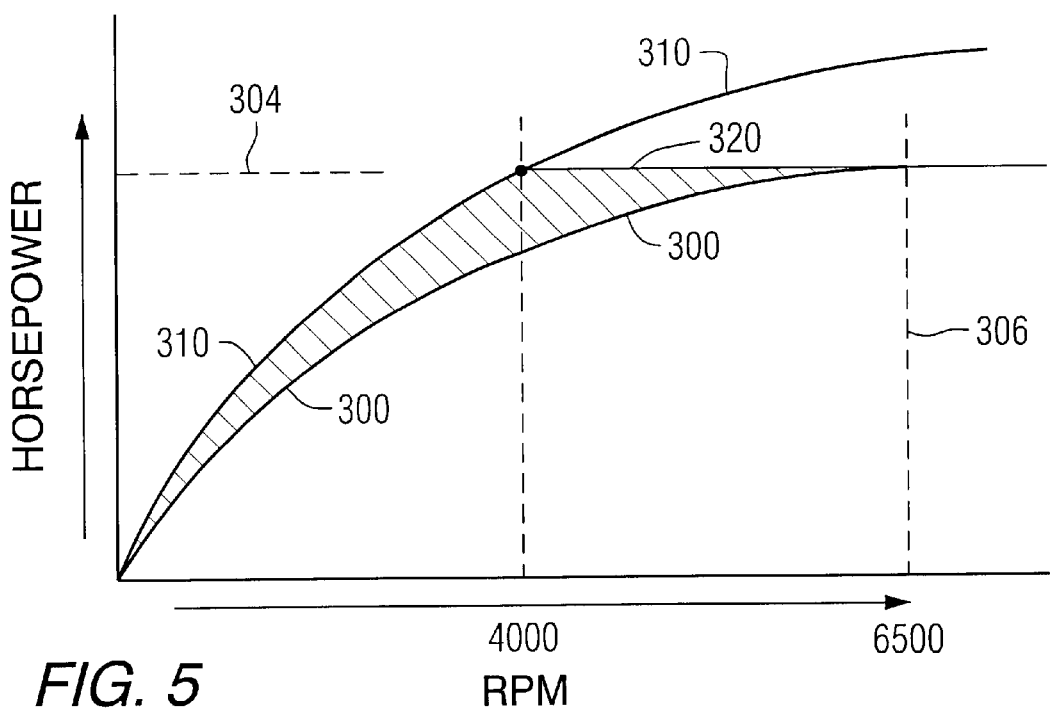
FIG. 5 is a graphical representation comparing the results of the present invention to the results of known engine arrangements.

FIG. 5 is a graphical representation of the relationship between horsepower and engine speed for two hypothetical engines. The relationship between horsepower and engine speed for a first hypothetical engine is represented by line 300. The engine associated with line 300 is sized to limit the output horsepower from the engine to an allowed maximum, represented by dashed line 304, which is set by the National Marine Manufacturers Association (NMMA). As an example, an engine rated at 200 horsepower can only exceed 200 horsepower at top speed of approximately 6500 RPM, as represented by dashed line 306, by no more than 10%. For example, a 200 horsepower engine cannot provide more than 220 horsepower at 6500 RPM and remain within the standards set by the NMMA. This presents a serious problem at lower engine speeds because the marine propulsion system requires a certain magnitude of power in order to enable a marine vessel to achieve planing speed within a reasonable period of time. It would therefore be significantly beneficial if the NMMA standard, represented by dashed line 304, can be consistently observed while also increasing the available power output of the engine at lower engine speeds. Line 310 represents the horsepower relationship with engine speed for an engine configured with the present invention. It can be seen that at engine speeds less than 4000 RPM, the engine represented by line 310 provides significantly more power output than the engine represented by line 300. However, if some constraint was not provided at higher engine speeds, the engine represented by line 310 would exceed the allowable NMMA limits represented by dashed line 304. Continuing with the hypothetical example represented by the lines in FIG. 5, and with reference to FIG. 3, the engine control module 78 would sense the engine speed from a tachometer and adjust the position of the bypass valve 114 when the engine speed approaches a preselected threshold magnitude, such as 4000 RPM in FIG. 5. When this occurs, the engine control module 78 begins to open the bypass throttle is 114 to allow air to bypass from the outlet passage 52 of the screw compressor 48 to its inlet passage 50. The air that flows through the bypass conduit 110 does not flow to the combustion chambers of the engine 172 and therefore does not assist in the production of power from the engine. If the bypass valve 114 is appropriately monitored by the engine control module 78 and opened in conjunction with engine speed, provided on line 80 from the tachometer 76 shown in FIG. 2, the power output of the engine can be caused to proceed along line 320 at engine speeds greater than 4000 RPM. As a result, the NMMA standards are not violated, but the power output from the engine is increased as represented by the shaded area in FIG. 5 between lines 300 and the combined upper boundaries defined by lines 310 and 320. In addition, a smaller engine can be used. It should be understood that the operation of the bypass valve 114 is not binary in nature, like a switch, but, instead, can assume many positions between fully opened and fully closed. This is particularly true when the engine is operated at throttle positions that result in engine speeds and power outputs which fall below curve 310 in FIG. 5. Under these circumstances, the engine is operated with the bypass valve partially or fully closed, particularly at operating conditions which result in a combination of horsepower and engine speed that is both below line 310 and above a line under which the engine can operate in a naturally aspirated condition. It should also be understood that a normally open bypass valve is used in a preferred embodiment of the present invention for safety purposes. When the engine is turned off for any reason, the bypass valve assumes an open condition.

The present invention provides an outboard motor with a screw compressor and a bypass conduit through which air flow can be controlled by an engine control module and the manipulation of a bypass valve. The use of the screw compressor allows higher power output to be achieved by an engine and the control of the bypass valve by the engine control module avoids the violation of any existing standard limits, such as those set by the NMMA. By using a screw compressor, instead of a Roots compressor, higher compressed air pressures can be achieved. Also, a screw compressor is more thermodynamically efficient than most alternatives. The use of a screw compressor allows the outboard motor to use a smaller engine than would otherwise be necessary since it provides more power with its pressurized charge air than a normally aspirated engine of the same size.

Although the present invention has been described with considerable detail and illustrated to show a particularly preferred embodiment, it should be understood that alternative embodiments are also within its scope.

I claim:
1. An outboard motor, comprising:
   an internal combustion engine having a plurality of cylinders, each of said plurality of cylinders each having one of a plurality of pistons slidably disposed therein for reciprocal movement;
   a crankshaft driven by said plurality of pistons of said engine and supported within said engine for rotation about a vertical axis;
   a propulsor connected in torque transmitting relation with said crankshaft;
   an air conduit connected in fluid communication with said plurality of cylinders;
   a screw compressor having an inlet passage and an outlet passage, said outlet passage being connected in fluid communication with said air conduit, said screw compressor comprising a first screw rotor rotatable about a first rotor axis and a second screw rotor rotatable about a second rotor axis, said first and second rotor axes being parallel to said vertical axis;
   a bypass conduit connected in fluid communication with said outlet passage of said screw compressor; and
   a bypass valve disposed within said bypass conduit to control the flow of air from said outlet passage to said air conduit.
2. The outboard motor of claim 1, wherein:
   said first screw rotor has five flutes and said second screw rotor has three flutes.
3. The outboard motor of claim 1, further comprising:
   a charge air cooler disposed in fluid communication with said air conduit.
4. The outboard motor of claim 1, further comprising:
   a tachometer associated with said internal combustion engine and providing an engine speed signal; and
   an engine control module connected in signal communication with said tachometer and with said bypass valve, said engine control module being configured to open said bypass valve to a magnitude which is a function of said engine speed signal.

5. The outboard motor of claim 4, wherein:

said engine control module causes said bypass valve to be closed when said engine speed signal represents an engine speed below a preselected threshold.

6. The outboard motor of claim 5, wherein:

said engine control module causes said bypass valve to be at least partially opened when said engine speed signal represents an engine speed above said preselected threshold.

7. The outboard motor of claim 1, wherein:

said screw compressor is attached to said internal combustion engine at a front side of said internal combustion engine.

8. The outboard motor of claim 1, wherein:

said screw compressor is connected in torque transmitting relation with said crank shaft by an arrangement of two pulleys and an interconnecting belt.

9. An outboard motor, comprising:

an internal combustion engine having a plurality of cylinders, each of said plurality of cylinders each having one of a plurality of pistons slidably disposed therein for reciprocal movement;

a crankshaft driven by said plurality of pistons of said engine and supported within said engine for rotation about a vertical axis;

a propulsor connected in torque transmitting relation with said crankshaft;

an air conduit connected in fluid communication with said plurality of cylinders;

a screw compressor having an inlet passage and an outlet passage, said outlet passage being connected in fluid communication with said air conduit, said screw compressor comprising a first screw rotor rotatable about a first rotor axis and a second screw rotor rotatable about a second rotor axis, said first and second rotor axes being parallel to said vertical axis;

a bypass conduit disposed in fluid communication between said inlet passage and said outlet passage of said screw compressor; and a bypass valve disposed within said bypass conduit to control the flow of air from said outlet passage to said inlet passage.

10. The outboard motor of claim 9, further comprising:

a charge air cooler disposed in fluid communication with said air conduit.

11. The outboard motor of claim 9, further comprising:

a tachometer associated with said internal combustion engine and providing an engine speed signal; and an engine control module connected in signal communication with said tachometer and with said bypass valve, said engine control module being configured to open said bypass valve to a magnitude which is a function of said engine speed signal.

12. The outboard motor of claim 11, wherein:

said engine control module causes said bypass valve to be closed when said engine speed signal represents an engine speed below a preselected threshold and said engine control module causes said bypass valve to be at least partially opened when said engine speed signal represents an engine speed above said preselected threshold.

13. The outboard motor of claim 12, wherein:

said screw compressor is attached to said internal combustion engine at a front side of said internal combustion engine.

* * * * *